United States Patent
Chauvin et al.

(10) Patent No.: US 12,331,974 B2
(45) Date of Patent: Jun. 17, 2025

(54) HEAT PUMP AND PHASE-CHANGE ENERGY STORAGE DEVICE

(71) Applicant: ARKEON ENERGY, Saint-Cyr-L'École (FR)

(72) Inventors: Philippe Chauvin, Saint-Cyr-L'École (FR); Hadrien Othnin-Girard, Hamburg Allemagne (DE); Théo Granger, Paris (FR)

(73) Assignee: ARKEON ENERGY, Saint-Cyr-L'École (FR)

( * ) Notice: Subject to any disclaimer, the term of this patent is extended or adjusted under 35 U.S.C. 154(b) by 42 days.

(21) Appl. No.: 18/557,360

(22) PCT Filed: Apr. 27, 2022

(86) PCT No.: PCT/EP2022/061277
§ 371 (c)(1),
(2) Date: Oct. 26, 2023

(87) PCT Pub. No.: WO2022/229293
PCT Pub. Date: Nov. 3, 2022

(65) Prior Publication Data
US 2024/0377058 A1    Nov. 14, 2024

(30) Foreign Application Priority Data
Apr. 27, 2021 (FR) .......... 2104387

(51) Int. Cl.
*F25B 7/00* (2006.01)
*F28D 20/02* (2006.01)
*F28D 20/00* (2006.01)

(52) U.S. Cl.
CPC .......... *F25B 7/00* (2013.01); *F28D 20/021* (2013.01); *F24D 2220/10* (2013.01); *F28D 2020/0013* (2013.01)

(58) Field of Classification Search
CPC ...... F25B 7/00; F24D 2220/10; F28D 20/021; F28D 2020/0013
See application file for complete search history.

(56) References Cited

U.S. PATENT DOCUMENTS

| | | | |
|---|---|---|---|
| 5,386,709 A * | 2/1995 | Aaron | F25B 40/02 62/79 |
| 2015/0191182 A1* | 7/2015 | Abou Eid | F25D 21/06 62/335 |

(Continued)

FOREIGN PATENT DOCUMENTS

| | | |
|---|---|---|
| CN | 111156699 A | 5/2020 |
| WO | WO 2008/037896 A2 | 4/2008 |

OTHER PUBLICATIONS

Machine translation of WO-2008037896-A2, accessed Mar. 7, 2025. (Year: 2025).*

(Continued)

*Primary Examiner* — Jonathan R Matthias
(74) *Attorney, Agent, or Firm* — Pillsbury Winthrop Shaw Pittman LLP

(57) ABSTRACT

A system includes a heat pump including a system for conveying a refrigerant fluid between two heat exchangers, the refrigerant fluid circulating through a closed circuit; at least two heat exchangers, at least one of the first and second heat exchangers including a plurality of energy storage devices collecting a portion of the energy of the refrigerant fluid or of a secondary fluid; a system for conveying the refrigerant fluid intended to receive or transmit a given amount of energy through the plurality of energy storage devices, and a system for conveying a secondary fluid intended to receive or transmit a given amount of energy through the plurality of energy storage devices.

12 Claims, 7 Drawing Sheets

(56) References Cited

U.S. PATENT DOCUMENTS

| | | | |
|---|---|---|---|
| 2016/0116172 A1* | 4/2016 | Göransson | F24D 3/087 |
| | | | 122/15.1 |
| 2016/0187013 A1* | 6/2016 | Becker | F24F 5/0017 |
| | | | 62/99 |
| 2018/0010822 A1 | 1/2018 | Trant et al. | |
| 2018/0372337 A1 | 12/2018 | Walker et al. | |

OTHER PUBLICATIONS

International Search Report as issued in International Patent Application No. PCT/EP2022/061277, dated Sep. 1, 2022.

* cited by examiner

HEAT PUMP AND PHASE-CHANGE ENERGY STORAGE DEVICE

CROSS-REFERENCE TO RELATED APPLICATIONS

This application is the U.S. National Stage of PCT/EP2022/061277, filed Apr. 27, 2022, which in turn claims priority to French patent application number 2104387 filed Apr. 27, 2021. The content of these applications are incorporated herein by reference in their entireties.

FIELD OF THE INVENTION

The field of the invention relates to the field of systems comprising a heat pump. In particular, the field of the invention relates to the field of systems comprising a heat pump and at least one energy storage device. More particularly, the field of the invention relates to the field of systems comprising a heat pump and at least one energy storage device comprising a phase-change material.

PRIOR ART

Systems comprising both a heat pump and energy storage devices comprising phase-change materials exist in the prior art.

These systems make it possible to store thermal energy taken from a cold source by the heat pump in phase-change materials.

As an example, the document CN111156699 describes a water heating system comprising a heat pump and an energy storage device comprising phase-change materials, to store the thermal energy taken from the air of the external medium by the heat pump.

However, the heat pumps described in the systems of the prior art use as cold source media in which the temperature is likely to vary over time.

For example, in the case of the technical solution described by the previously introduced Chinese document, it is described that the cold source of the heat pump is the external medium. However, the temperature of the external medium is likely to vary depending on the time of year or more simply if the heat pump is installed in a region where the weather conditions are unstable.

A problem remains, since the temperature of the cold source and the temperature of the hot source used by the heat pump, and more precisely the temperature differential between these sources, has a significant influence on the coefficient of performance of the heat pump, also known by the acronym COP.

Therefore, there exists a need to properly control the temperature of the cold source and the temperature of the hot source, and to reduce the differential between said sources, so as to obtain better performances when operating the heat pump.

The invention detailed below makes it possible to solve the aforementioned drawbacks by proposing a system comprising a heat pump and a phase-change energy storage device used notably as cold source by the heat pump.

Thus, in the system according to the invention, the temperature of the cold source of the heat pump is linked to a component of the system. Therefore, the coefficient of performance of the heat pump may be optimized thanks to the control of the temperature of the cold source.

Furthermore, the system according to the invention makes it possible to avoid the need to oversize the heat pump to compensate for temperature variations of the external medium.

SUMMARY OF THE INVENTION

According to a first aspect, the invention pertains to a system comprising:
  A heat pump comprising:
    i. Means for conveying a refrigerant fluid between two heat exchangers, said refrigerant fluid circulating through a closed circuit;
  At least two heat exchangers, at least one of said exchangers comprising:
    i. a plurality of energy storage elements collecting a portion of the energy of the refrigerant fluid or a secondary fluid;
    ii. means for conveying the refrigerant fluid intended to receive or transmit a given amount of energy through the plurality of energy storage elements;
    iii. means for conveying a secondary fluid intended to receive or transmit a given amount of energy through the plurality of energy storage elements,
  characterized in that said plurality of energy storage elements comprises a phase-change material and in that at least one of said heat exchangers is used as cold source by the heat pump.

One advantage is to improve the coefficient of performance of the heat pump by reducing the temperature differential between the hot source and the cold source and by managing the temperature of the cold source.

According to one embodiment, the system comprises two heat exchangers used respectively as cold source and as hot source by the heat pump; the first heat exchanger comprising a plurality of energy storage elements configured to collect a first amount of thermal energy from the first secondary fluid and the second heat exchanger comprising a plurality of energy storage elements configured to transmit a second amount of thermal energy to the second secondary fluid.

One advantage is to be able to supply thermal energy or to withdraw thermal energy from a secondary fluid to increase or decrease its temperature as a function of the application cases, for example for heating or air conditioning applications in buildings.

According to one embodiment, at least one energy storage element of the first heat exchanger is configured to transmit at least a part of the first amount of collected thermal energy to the refrigerant fluid.

One advantage is to return a part of the energy taken from the refrigerant fluid to the secondary fluid to increase its temperature. Another advantage is to be able to convey the collected thermal energy to another heat exchanger, through the refrigerant fluid.

According to one embodiment, at least one energy storage element of the second heat exchanger is configured to collect at least a part of the second amount of energy through a thermal transfer between said at least one energy storage element and the refrigerant fluid.

One advantage is to be able to collect a part of the thermal energy of the refrigerant fluid in order to be able to return it later to the secondary fluid with the aim of increasing its temperature.

According to one embodiment, the system comprises a condenser and an evaporator, the refrigerant fluid circulating within said condenser and said evaporator; said evaporator and said condenser being in contact with at least one energy storage element of at least one heat exchanger.

One advantage is to facilitate heat exchanges between the energy storage elements and the refrigerant fluid circulating within the condenser and the evaporator.

According to one embodiment, at least one of the heat exchangers comprises a phase-change material, said phase-change material being in contact with an exchanger within which the refrigerant fluid circulates or an exchanger within which one of the secondary fluids circulates.

One advantage is to facilitate heat exchanges at the level of the heat exchangers with the different fluids.

According to one embodiment, the system comprises means for recovering an amount of waste heat and means for conveying said amount of waste heat to at least one energy storage element of the second heat exchanger.

One advantage is to valorize an amount of residual heat, for example from a production site, which would be lost if it was not recovered.

According to one embodiment, the system comprises a steam energy production device comprising at least one expansion machine, said expansion machine being supplied by at least a part of the thermal energy stored in one of the heat exchangers, said device being configured to produce mechanical energy from said expansion machine.

One advantage is to valorize the thermal energy stored in an exchanger and not used, in the form of a mechanical production.

According to one embodiment, the production of mechanical energy by the steam energy production cycle may be managed by control means.

One advantage is to be able to produce mechanical energy from the thermal energy stored in an exchanger at a suitable moment, for example when excess industrial heat is available or the exchanger stores an excess amount of thermal energy compared to the heating demand.

According to one embodiment, the system comprises a generator or alternator to transform the mechanical energy produced into electrical energy.

One advantage is to exploit the mechanical energy produced from the heat recovered in at least one of the exchangers to produce an amount of electricity being able to be exploited later, for example for the supply of third party equipment.

According to one embodiment, the system comprises a memory periodically recording temperatures of at least two fluids among the following fluids:
the part of the refrigerant fluid circulating in the first exchanger;
the part of the refrigerant fluid circulating in the second exchanger;
the first secondary fluid entering the first exchanger;
the first secondary fluid exiting the first exchanger;
the second secondary fluid entering the second exchanger;
the second secondary fluid exiting the second exchanger, and comprising a calculator to perform a calculation of a temperature difference or a comparison of each temperature with at least one threshold value, said system comprising a command member receiving an energy setpoint to:
manage the flow rate of an incoming secondary fluid or, manage a shut-off valve of the steam energy production device.

One advantage is to be able to determine a suitable moment to perform different actions on the system, as a function of information gathered about the temperatures of the different fluids circulating in the system.

According to another aspect, the invention pertains to a system comprising:
a first heat pump comprising an evaporator and a condenser, and comprising means for conveying a refrigerant fluid between two heat exchangers, said refrigerant fluid circulating through a first closed circuit;
a first heat exchanger and a second heat exchanger, the first heat exchanger being used as cold source by the heat pump, and at least one of said first and second exchangers comprising:
a portion of the first circuit for conveying the refrigerant fluid through said first or second exchanger;
a portion of a second circuit in which a secondary fluid circulates, to convey said secondary fluid through said first or second exchanger,
a phase-change material distributed in the heat exchanger and collecting a portion of an amount of thermal energy transported by the refrigerant fluid in the portion of the first circuit or by the secondary fluid in the portion of the second circuit.
A second heat pump comprising an evaporator and a condenser and comprising a third circuit for conveying a third refrigerant fluid between the evaporator and the condenser of said second heat pump, said evaporator allowing a calorific exchange between the third refrigerant fluid and a primary calorie source and said condenser being positioned in the first exchanger to allow an exchange of calories between, on the one hand, the third refrigerant fluid and the phase-change material and, on the other hand, the third refrigerant fluid and the secondary fluid.

According to one embodiment, the portion of the first circuit and the portion of the second circuit form curves of substantially equal dimensions each extending between two walls of the heat exchanger and forming successive plates defining a volume inside the heat exchanger, the phase-change material being arranged around the volume and between the plates formed by the first circuit and the second circuit, to facilitate heat exchange between, on the one hand, the phase-change material and the refrigerant fluid and, on the other hand, the phase-change material and the secondary fluid.

According to one embodiment, the system comprises a plurality of energy storage elements comprising the phase-change material, said energy storage elements being distributed in said heat exchangers and in contact with the portion of the first circuit and the portion of the second circuit to allow, on the one hand, a calorific exchange between the refrigerant fluid and the phase-change material and, on the other hand, a calorific exchange between the phase-change material and the secondary fluid.

According to one embodiment, the evaporator is positioned in the first heat exchanger and the condenser is positioned in the second heat exchanger, and the first heat exchanger and the second heat exchanger each comprise the energy storage elements that are in contact with said evaporator and said condenser of the first heat pump.

According to one embodiment, the portion of the first circuit of the first heat exchanger and/or the second heat exchanger forms curves of substantially equal dimensions.

According to one embodiment, the energy storage elements have a substantially oblong shape, and comprise a central opening allowing an apex of a curve of the portion of the first circuit to be inserted through said energy storage elements, so as to promote a calorific exchange between the refrigerant fluid and the phase-change material.

According to one embodiment, the first heat exchanger or the second heat exchanger has a substantially cylindrical shape, and wherein the energy storage elements are substantially equal in size to allow a stacking of said energy storage elements on several loops of the portion of the first circuit.

According to one embodiment, the energy storage elements comprise surface singularities to promote a turbulent flow of the secondary fluid.

According to one embodiment, the system comprises a steam energy production device comprising at least one expansion machine, said expansion machine being supplied by at least a part of the thermal energy stored by the phase-change material, said steam energy production device being capable of producing a mechanical energy from said expansion machine.

According to one embodiment, the first refrigerant fluid $FL_1$ or the second refrigerant fluid $FL_2$ or the third refrigerant fluid $FL_3$ comprises one of the following refrigerant fluids: R1336mzz-Z, R1233zd.

One advantage is to use a fluid of which the performances are enhanced not being able to operate simply with a heat pump with high cold thermal source.

According to one embodiment, the system comprises a turbo compressor type technology to evaluate the refrigerant fluid at a pressure of less than 1 bar.

According to one embodiment, the primary calorie source comprises a heat network.

According to one embodiment, the system comprises an architecture with several compression stages.

BRIEF DESCRIPTION OF THE FIGURES

Other characteristics and advantages of the invention will become clearer upon reading the following detailed description, in reference to the appended figures, that illustrate.

DETAILED DESCRIPTION

Heat Pump

The system of the invention comprises a heat pump PAC. The heat pump PAC makes it possible to transfer thermal energy from a cold source to a hot source and thus reverse the spontaneous direction of thermal energy transfer between two sources.

Figure 1:
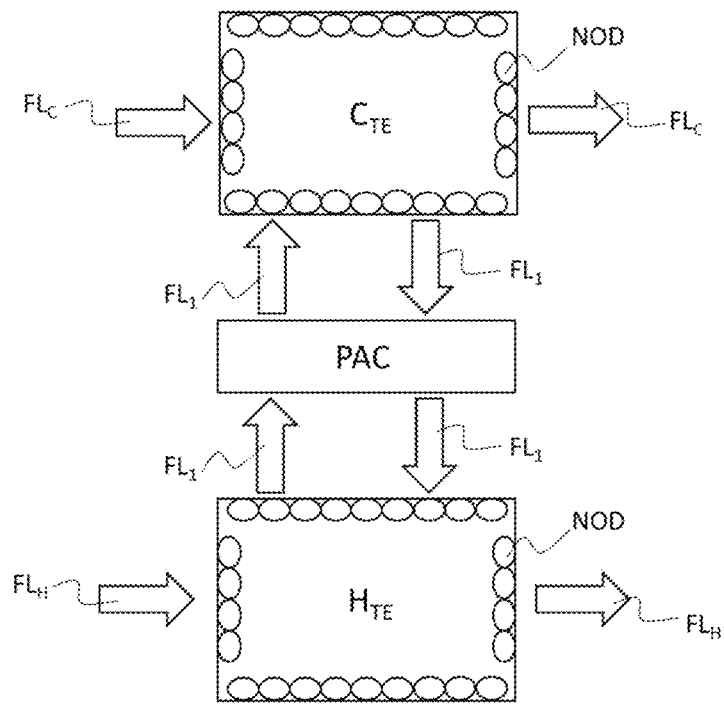
FIG. 1: a heat pump and two heat exchangers.

According to one embodiment, with reference to FIG. 1, the system comprises the heat pump PAC, the first heat exchanger $C_{TE}$ and the second heat exchanger $H_{TE}$. According to one example, the first heat exchanger $C_{TE}$ is used as cold source by the heat pump PAC and the second heat exchanger $H_{TE}$ is used as hot source by the heat pump PAC.

According to different cases, the type of heat pump used comprises an aerothermal heat pump such as an air-air heat pump or an air-water heat pump, a hydrothermal heat pump such as a water-water heat pump, a geothermal heat pump, an aquathermal heat pump, or a hybrid heat pump. However, the type of heat pump used in the system of the invention is not limited to the aforesaid examples. Indeed, any heat pump technology or combination of heat pump technologies between them are capable of being implemented in the system depending on the use cases.

According to one embodiment, the system comprises a compressor $C_P$, an evaporator $E_V$, an expansion member $D_t$ also referred to as "pressure regulator" and a condenser $C_d$. This is particularly advantageous for the implementation of a thermodynamic cycle by the heat pump PAC. The term "thermodynamic cycle" here refers to a series of successive transformations undergone by a refrigerant fluid in a thermodynamic system, the refrigerant fluid returning to its initial state so as to be able to begin the cycle again.

In the remainder of the description, the expansion machine $D_t$ will be referred to indifferently by the terms "expansion member $D_t$" or "pressure regulator $D_t$".

In one embodiment, the heat pump PAC is reversible. Reversible is taken to mean that the functions of the condenser $C_d$ and the evaporator $E_V$ may be reversed. According to an exemplary case, this reversibility is made possible by the implementation of a three-way valve.

Refrigerant Fluid

In one embodiment, the system comprises a refrigerant fluid $FL_1$, also referred to as "refrigerating fluid", "heat transfer fluid" or "refrigerant" in the technical literature. In the remainder of the description, the refrigerant fluid $FL_1$ will be referred to interchangeably by the terms "refrigerant fluid $FL_1$", "heat transfer fluid $FL_1$" or even "refrigerant $FL_1$".

The refrigerant fluid $FL_1$ makes it possible to convey an amount of thermal energy captured in a cold source to a hot source, hence its designation in French as "fluide caloporteur" (heat transfer fluid), in reference to the "calorie", a unit of measure previously used to designate an amount of heat. According to the different application cases, the refrigerant fluid comprises a mixture of fluids in liquid phase, a mixture of fluids in gaseous phase, or a mixture of fluids comprising liquid and gaseous phases.

The refrigerant $FL_1$ is for example used in the heat pump to implement a thermodynamic cycle. In one embodiment, the refrigerant $FL_1$ circulates in a closed circuit through the compressor $C_P$, the pressure regulator $D_t$, the evaporator $E_V$ and the condenser $C_d$.

According to several examples, the refrigerant $FL_1$ used comprises hydrofluorocarbons also designated by the acronym HFC such as the zeotropic mixture R407C, hydrocarbons also designated by the acronym HC, ammonia also designated as a refrigerant by the designation R717 or an azeotropic mixture also called azeotropic mixture.

In a preferred embodiment, the refrigerant $FL_1$ comprises a fluorinated derivative of alkenes, for example a hydrofluoroalkene. According to one example, the hydrofluoroalkene comprises 2,3,3,3-tetrafluoropropene also referred to as "R-1234yf". One advantage is to implement a refrigerant with a reduced global warming potential and zero ozone depletion potential, and therefore more environmentally friendly.

However, the type of refrigerant $FL_1$ used is not limited to the aforesaid examples and may also comprise any type of fluid or chemical compound capable of being used as a refrigerant fluid in the implementation of a thermodynamic cycle, by a heat pump. The refrigerant $FL_1$ used may also comprise a combination of several refrigerant fluids or chemical compounds with each other when such a combination is relevant for specific application cases.

PAC: Compressor

According to one embodiment, the compressor $C_P$ is used in the implementation of a thermodynamic cycle by the heat pump PAC. The role of the compressor $C_P$ is to raise the energy level in the refrigerant fluid $FL_1$, by compressing it. According to one example, the compressor $C_P$ is located between the condenser $C_d$ and the evaporator $E_V$ in the system.

According to different embodiments, the compressor $C_P$ may comprise a volumetric compressor such as a screw compressor, a piston compressor or even a spiral compressor also referred to as "scroll compressor". The compressor $C_P$ may also comprise a centrifugal compressor or "turbocompressor". The compressor $C_P$ implemented may be a "hermetic" compressor, or even a "semi-hermetic" compressor, also referred to as "accessible hermetic" or "open hermetic". The type of compressor $C_P$ implemented notably depends on the power of the heat pump.

The compressor $C_P$ requires an electrical supply to operate. The coefficient of performance or "COP" of the heat pump PAC is moreover evaluated by the ratio between the electrical consumption of the compressor $C_P$ and the energy produced by the heat pump PAC. According to different embodiments, the electrical supply of the compressor $C_P$ may be realized by a connection to the electrical grid, by one or more batteries or even by an electrical supply system operating with one or more renewable energy sources.

According to different examples, the type of batteries used to supply the compressor comprises lithium-ion, Ni-Cad, Ni-Mh or Pb/Sla technologies. However, this embodiment of the invention is not limited to the aforesaid battery technologies, and any battery technology could be implemented to supply the compressor $C_P$.

It is also possible to combine several battery technologies with each other or even to couple the supply by battery with another electrical supply source to supply the compressor $C_P$, for example with a system operating with a renewable energy source.

According to several examples, the renewable energy source may comprise a solar energy source, a hydraulic energy source, a wind energy source, a geothermal source or even a biomass energy source. However, in the context of the invention, the aforesaid examples are not limiting and any renewable energy source could be exploited. It is also possible to supply the compressor $C_P$ with electrical energy from a combination of several renewable energy sources, or even by a combination with another electrical energy supply system.

According to one case, the refrigerant fluid $FL_1$ circulates in the compressor $C_P$ in gaseous form. The refrigerant fluid $FL_1$ in gaseous form is compressed in the compressor $C_P$ and the compression causes an increase in the pressure on the refrigerant fluid $FL_1$ and thus the temperature of said refrigerant fluid $FL_1$.

According to one embodiment, several compressors $C_P$ are combined with each other. "Combined with each other" is taken to mean that several compressors $C_P$ are associated and that the refrigerant fluid $FL_1$ in gaseous form passes successively through each of the compressors $C_P$. This embodiment is particularly advantageous for reaching a higher pressure and thus also a higher temperature.

PAC: Condenser

The system according to the invention comprises a condenser $C_d$. As an example, the condenser $C_d$ receives the refrigerant fluid $FL_1$ at the outlet of the compressor $C_P$. The role of the condenser $C_d$ is to lower the temperature in the refrigerant fluid $FL_1$ which will reach its condensation temperature on cooling down.

According to different embodiments, the condenser $C_d$ comprises an air condenser or a water condenser. In one embodiment, the air condenser comprises a finned tube condenser.

According to several embodiments, the water condenser comprises a coaxial tube condenser, a brazed plate condenser, a coil condenser, or even a multi-tube condenser.

According to an exemplary case, the refrigerant fluid $FL_1$ exits the compressor $C_P$ and enters the condenser $C_d$ in gaseous form. The refrigerant fluid $FL_1$ in gaseous form then undergoes a so-called "desuperheating" phenomenon by cooling down to a constant temperature and pressure. The refrigerant fluid $FL_1$ in gaseous form next undergoes a progressive change of state from a gaseous state to a liquid state during which it gives up a part of its thermal energy in the form of latent heat to the environment in which it operates. When the change of state to the liquid state has been completely achieved, the refrigerant fluid $FL_1$ undergoes a so-called "subcooling" phenomenon at constant pressure $P_{FL1}$ by giving up a part of its thermal energy in the form of sensible heat to the environment in which it operates.

According to one example, the second amount of thermal energy $E_H$ given up to the environment by the refrigerant fluid $FL_1$ comprises the latent heat of condensation of the refrigerant fluid $FL_1$, the sensible heat of subcooling of the refrigerant fluid $FL_1$ and the sensible heat of superheated steam of the refrigerant fluid $FL_1$.

PAC: Evaporator

According to one embodiment, the system according to the invention comprises an evaporator $E_V$. The role of the evaporator is to evaporate the refrigerant fluid $FL_1$.

According to one example, the refrigerant fluid $FL_1$ enters within the evaporator $E_V$ in liquid form and undergoes a change of state to the gaseous state within said evaporator $E_V$. This change of state induces a cooling of the refrigerant fluid $FL_1$, which is then going to capture heat coming from the medium in which it operates.

According to different embodiments, the type of evaporator $E_V$ implemented comprises a so-called "dry expansion" evaporator also called "overheated evaporator" or "dry evaporator", or a so-called "flooded" evaporator.

According to several examples, the dry expansion evaporator comprises a superheated multitubular evaporator, a brazed plate exchanger or a coaxial evaporator.

According to other examples, the "flooded" type evaporator comprises a flooded multitube exchanger or a flooded coil exchanger. The evaporator $E_V$ implemented may also comprise a combination of several evaporator technologies.

According to other cases, the evaporator $E_V$ implemented comprises a natural convection finned evaporator, a forced convection finned evaporator or a natural convection smooth tube evaporator.

PAC: Pressure Regulator

The role of the expansion member $D_t$ is to lower the pressure $P_{FL1}$ of the refrigerant fluid $FL_1$. This lowering of pressure is achieved on account of the pressure difference between the condenser $C_d$ and the evaporator $E_V$.

In a preferred embodiment, the expansion member $D_t$ comprises a thermostatic pressure regulator.

According to one embodiment, the thermostatic pressure regulator comprises a valve for regulating the flow of the refrigerant fluid $FL_1$. One advantage is to be able to control the amount of refrigerant fluid $FL_1$ admitted into the evaporator $E_V$ at the outlet of the pressure regulator. Indeed, if the evaporator $E_V$ admits a too small amount of the refrigerant fluid $FL_1$, its efficiency decreases, and if the evaporator Ev admits too large amount of refrigerant fluid $FL_1$ at the outlet of the pressure regulator $D_t$, there is a risk of damaging the compressor $C_p$ at the outlet of the evaporator $E_V$.

According to several examples, the expansion member $D_t$ comprises a thermostatic pressure regulator with external pressure equalization or a thermostatic pressure regulator with internal pressure equalization. One advantage is to be able to adapt the supply of the evaporator with refrigerant fluid $FL_1$ as a function of the cases of use. Another advantage is to improve the reliability of the system.

According to different embodiments, the expansion member $D_t$ comprises a low-pressure float pressure regulator, a high-pressure float pressure regulator, a magnetic level controller, a calibrated orifice or even an electronic pressure regulator. Advantageously, the type of expansion member $D_t$ used is chosen as a function of the thermodynamic system implemented.

Heat Exchangers

According to one embodiment, the system comprises two heat exchangers: the first so-called "cold" heat exchanger $C_{TE}$ and the second so-called "hot" heat exchanger $H_{TE}$. The heat exchangers $C_{TE}$ and $H_{TE}$ are designated respectively by the terms "cold" exchanger and "hot" exchanger because the exchanger $C_{TE}$ is used to cool the secondary fluid $FL_C$ and the hot exchanger $H_{TE}$ is used to heat the secondary fluid $FL_H$.

The heat exchangers $C_{TE}$ and $H_{TE}$ are designated by the term "exchanger" because they are the place of different heat transfers with the fluids $FL_C$, $FL_H$, $FL_1$. However, the functions of the exchangers $C_{TE}$ and $H_{TE}$ are not limited to the semantic field of the term "exchanger" used to designate them.

For example, the heat exchangers $C_{TE}$, $H_{TE}$ will be able to ensure both heat transfer functions between several fluids or several elements; as well as thermal energy storage functions over time.

The fluids $FL_C$ and $FL_H$ are furthermore designated by the term "secondary" to distinguish them from the refrigerant fluid $FL_1$. The secondary fluids $FL_C$, $FL_H$ are intended to meet external thermal requirements, for example heating or air conditioning in a building. They may also be used in the implementation of a secondary circuit in the system.

According to several examples, the heat exchangers $C_{TE}$, $H_{TE}$ may comprise a structural element of cubic shape, of ovoid shape, of spherical shape, or even of rectangular base shape, for example that of a plate. However, the shapes of the structural elements making up the heat exchangers $C_{TE}$, $H_{TE}$ are not limited to the aforesaid examples, and any type of geometric shape adapted to the system in which said exchangers $C_{TE}$, $H_{TE}$ are integrated could be used. According to one example, the two exchangers $C_{TE}$, $H_{TE}$ are composed of structural elements of different geometric shapes.

Energy Storage Elements

According to one embodiment, the heat exchanger $C_{TE}$ or $H_{TE}$ comprises one or more energy storage elements NOD. In one alternative, the two heat exchangers $C_{TE}$, $H_{TE}$ comprise one or more energy storage elements NOD.

The energy storage elements NOD collect a portion of an amount of thermal energy transported by the refrigerant fluid $FL_1$ or the secondary fluid $FL_2$, $FL_H$. The energy storage elements NOD comprise a phase-change material MCP. It may be for example paraffin. The energy storage elements NOD are distributed in the heat exchangers $C_{TE}$, $H_{TE}$ and in contact with a portion of the first circuit $C_1$ in which the refrigerant fluid $FL_1$ circulates.

Figure 11:
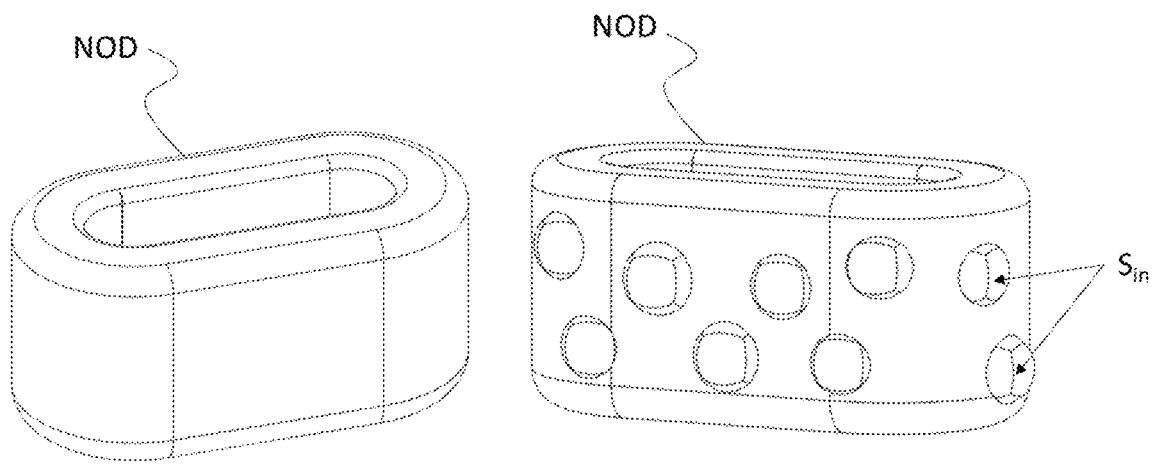
FIG. 11: a view, on the left, of an energy storage element having a substantially oblong shape and a smooth surface, and a view, on the right, of an energy storage element having singularities.
Figure 12:
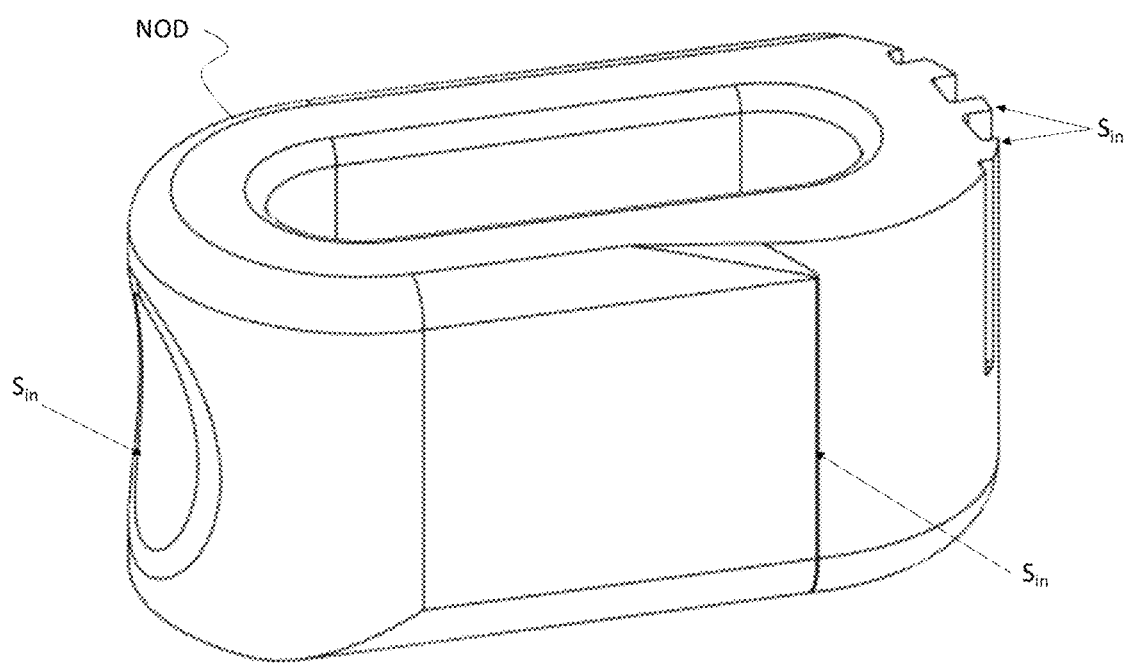
FIG. 12: a view of an energy storage element comprising a plurality of singularities of various shapes.
Figure 13:
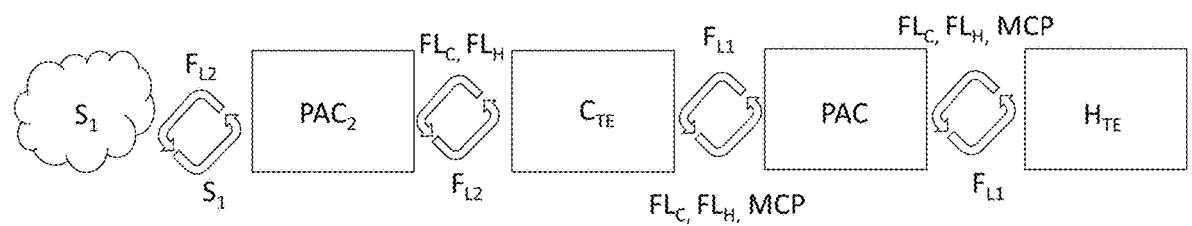
FIG. 13: a schematic representation of the system when it comprises a second heat pump.

According to one embodiment, with reference to FIG. 11, the energy storage elements NOD have a substantially oblong shape. This shape is particularly advantageous for promoting heat exchanges between the phase-change material MCP and for promoting a homogenous distribution of the energy storage elements NOD in the heat exchangers $C_{TE}$, $H_{TE}$.

According to one embodiment, with reference to FIG. 11, the energy storage elements NOD have singularities $S_i$. "Singularities" is taken to mean local modifications of the surface shape of the energy storage elements NOD. The singularities $S_i$ take for example various shapes such as local outgrowths or local irregularities, or even shapes that are recessed in the surface of the energy storage element NOD. The singularities take for example the shape of fins, or a substantially semi-spherical protrusion. The singularities $S_i$ make it possible to favor a particular flow of the secondary fluid $FL_C$, $FL_H$ along the energy storage elements NOD, for example a turbulent flow.

According to one embodiment, the energy storage elements NOD have an opening. The opening is for example located at the center of the energy storage elements. One advantage of the opening is to allow the stacking of the energy storage elements NOD on the portion of the first circuit of the first exchanger $C_1$ or the portion of the second circuit of the second exchanger $C_2$. This stacking advantageously makes it possible to promote heat exchanges between, on the one hand, the phase-change material MCP and the refrigerant fluid $FL_1$ and, on the other hand, the phase-change material MCP and the secondary fluid $FL_C$, $FL_H$.

According to one embodiment, at least one heat exchanger $C_{TE}$, $H_{TE}$ has a substantially cylindrical shape. One advantage is to facilitate the flow of fluids through the heat exchanger. Another advantage is to favor the distribution of the energy storage elements in the heat exchanger.

According to one embodiment, the energy storage elements NOD are in contact with a portion of the second circuit $C_2$ in which the secondary fluid $FL_C$, $FL_H$ circulates.

According to one embodiment, the portion of the first circuit $C_1$ and the portion of the second circuit $C_2$ form curves in the first heat exchanger $C_{TE}$ and/or in the second heat exchanger $H_{TE}$. The curves extend for example from a wall of the heat exchanger to an opposite wall of said heat exchanger. The curves form for example "loops" spaced apart from each other in which the refrigerant fluid $FL_1$ or the secondary fluid $FL_C$, $FL_H$ circulates.

According to one embodiment, the portion of the first circuit $C_1$ and the portion of the second circuit $C_2$ form successively superimposed plates in the heat exchanger $C_{TE}$, $H_{TE}$. The successive plates are for example separated by the phase-change material MCP.

According to one example, the energy storage elements NOD are configured to exchange energy, for example an amount of energy $E_C$ in the form of heat, with the refrigerant fluid $FL_1$, or with the secondary fluid $FL_C$.

According to one embodiment, the heat exchangers $C_{TE}$, $H_{TE}$ comprise one or more adiabatic walls. "Wall" of the heat exchanger $C_{TE}$ or $H_{TE}$ is taken to mean any surface delimiting the intersection between an internal zone of the heat exchanger $C_{TE}$ or $H_{TE}$ and the external medium. This embodiment is particularly advantageous for limiting heat exchanges between the internal zone of the heat exchangers $C_{TE}$, $H_{TE}$ and the external medium, and consequently for improving the energy efficiency of the system.

"Internal zone" of the heat exchanger $C_{TE}$ or $H_{TE}$ is taken to mean the zone in which heat exchanges take place between the different fluids $FL_1$, $FL_C$, $FL_H$ and the energy storage elements NOD, said internal zone being delimited by the walls of said heat exchanger $C_{TE}$ or $H_{TE}$.

"External" medium is taken to mean any zone lying outside of the "internal" zone of the heat exchanger $C_{TE}$ or $H_{TE}$ delimited by the walls of said exchanger $C_{TE}$ or $H_{TE}$.

"Adiabatic" is taken to mean that the wall of the heat exchanger $C_{TE}$ or $H_{TE}$ comprises a material of which the properties make it possible to limit heat exchanges between the internal medium of the heat exchanger $C_{TE}$ or $H_{TE}$ and the external medium, or even that the dimensions of the wall make it possible to limit heat transfers between the internal zone and the external medium, or a combination of these two properties.

According to one embodiment, at least one of the heat exchangers $C_{TE}$, $H_{TE}$ comprises a plurality of energy storage elements NOD uniformly distributed in the internal zone of said heat exchangers $C_{TE}$, $H_{TE}$. This embodiment is advantageous for optimizing heat exchanges within the exchanger $C_{TE}$ or $H_{TE}$ between the energy storage elements NOD and the different fluids $FL_1$, $FL_H$, $FL_C$. According to one alternative, the energy storage elements NOD are arranged in a disorganized manner in the heat exchangers $C_{TE}$, $H_{TE}$. "Disorganized" is taken to mean that the distribution of the energy storage elements NOD does not respect any geometric layout logic.

According to a preferred embodiment, the energy storage elements NOD comprise at least one phase-change material. The phase-change material comprises, for example, a mixture of pure bodies such as a eutectic mixture. Eutectic mixture is taken to mean a mixture of pure bodies that changes phase at a constant temperature in a uniform manner.

One advantage is to be able to transfer an amount of thermal energy to a secondary fluid, for example in the form of latent heat, by phase change of the eutectic mixture. In addition, the implementation of a eutectic mixture is particularly advantageous in the case of the use of one of the exchangers $C_{TE}$, $H_{TE}$ as source by the heat pump PAC, for example in the case of the use of the first heat exchanger $C_{TE}$ as cold source. Indeed, the coefficient of performance of the heat pump is dependent on the temperature of the sources and more specifically on the temperature differential between the hot source and the cold source. The fact of fixing the source temperatures over time makes it possible to reduce this differential and thus to improve the performances of the heat pump PAC.

According to an alternative, the phase-change material comprises a peritectic mixture. According to another example, the phase-change material is configured to implement at least one eutectoid transformation.

Figure 3:
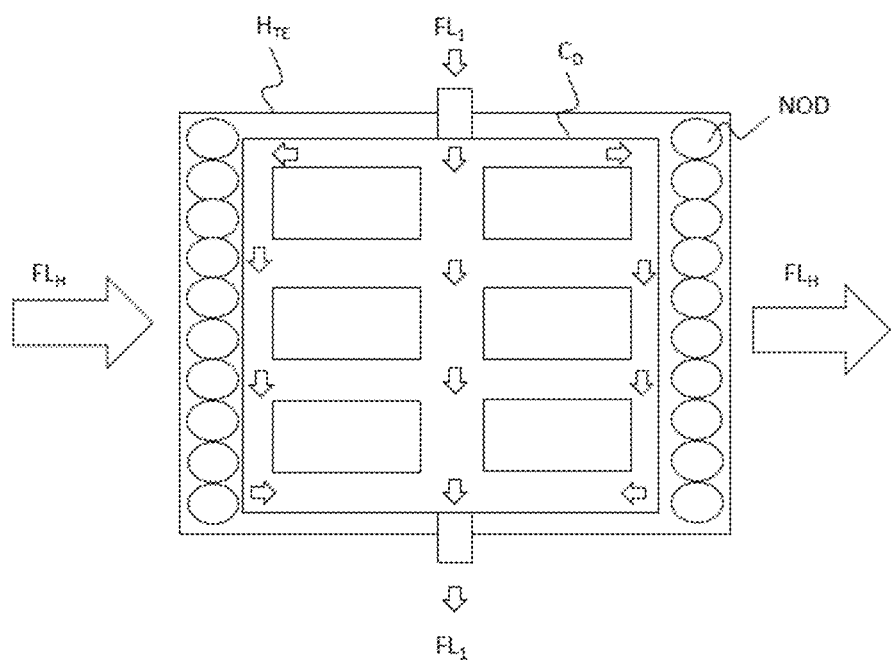
FIG. 3: a heat exchanger and an evaporator in contact with a plurality of energy storage elements.

According to one embodiment, with reference to FIG. 3, the first heat exchanger $C_{TE}$ comprises the evaporator $E_V$ of the heat pump PAC. It is understood that the first heat exchanger $C_{TE}$ "comprises" the evaporator $E_V$ by the fact that the evaporator $E_V$ of the heat pump PAC is located in the internal zone of the first heat exchanger $C_{TE}$. This embodiment is particularly advantageous in that it enables energy transfers between the refrigerant fluid $FL_1$ circulating within the evaporator $E_V$ and the energy storage devices NOD located in the first heat exchanger $C_{TE}$.

Figure 4:
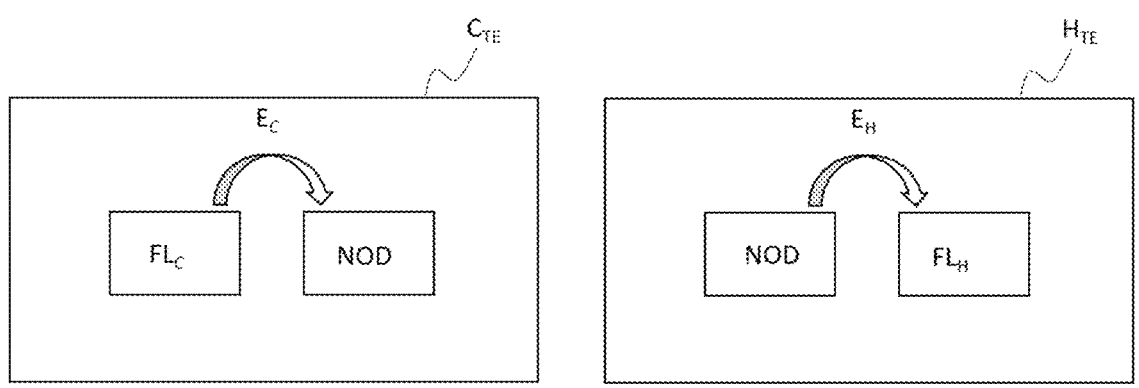
FIG. 4: a flow diagram of an energy transfer between the secondary fluids and the energy storage elements within two heat exchangers.
Figure 5:
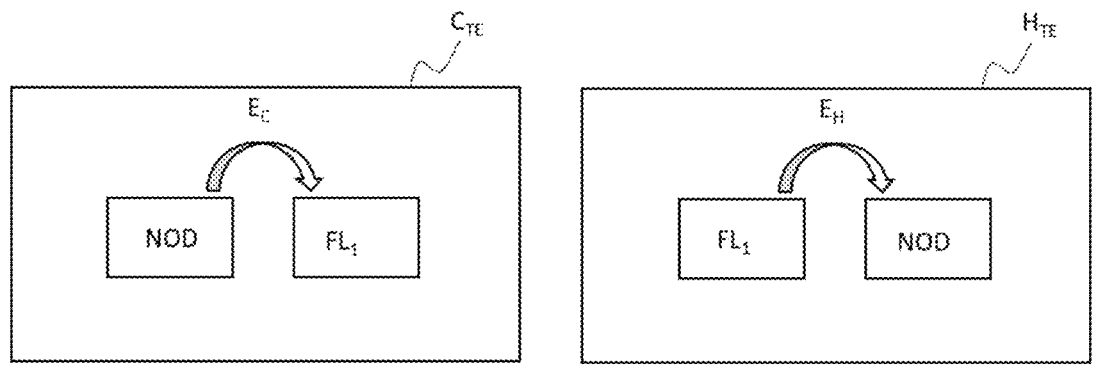
FIG. 5: a flowchart of an energy transfer between the refrigerant fluid and the energy storage elements within two heat exchangers.

According to an exemplary case, the refrigerant fluid $FL_1$ circulates in the evaporator $E_V$ located in the first heat exchanger $C_{TE}$ and undergoes a change of state going from a first liquid state to a second gaseous state by an evaporation phenomenon. With reference to FIG. 5, the change of state of the refrigerant fluid $FL_1$ stems from a thermal exchange between the energy storage elements NOD located in the first heat exchanger $C_{TE}$ and the refrigerant fluid $FL_1$. Indeed, the refrigerant fluid $FL_1$ captures a part of the energy contained in the energy storage elements NOD which "cold recharge" during this heat exchange. With reference to FIG. 4, the secondary fluid $FL_C$ circulating in the heat exchanger $C_{TE}$ is next going to cool on contact with the energy storage elements NOD by transmitting a part $E_C$ of its thermal energy to said energy storage elements NOD. The secondary fluid $FL_C$, which cools down on contact with the energy storage elements NOD, comprises for example air or water. In the context of this example, the secondary fluid $FL_C$ thus cooled may next advantageously be used in air conditioning applications within a building.

Figure 2:
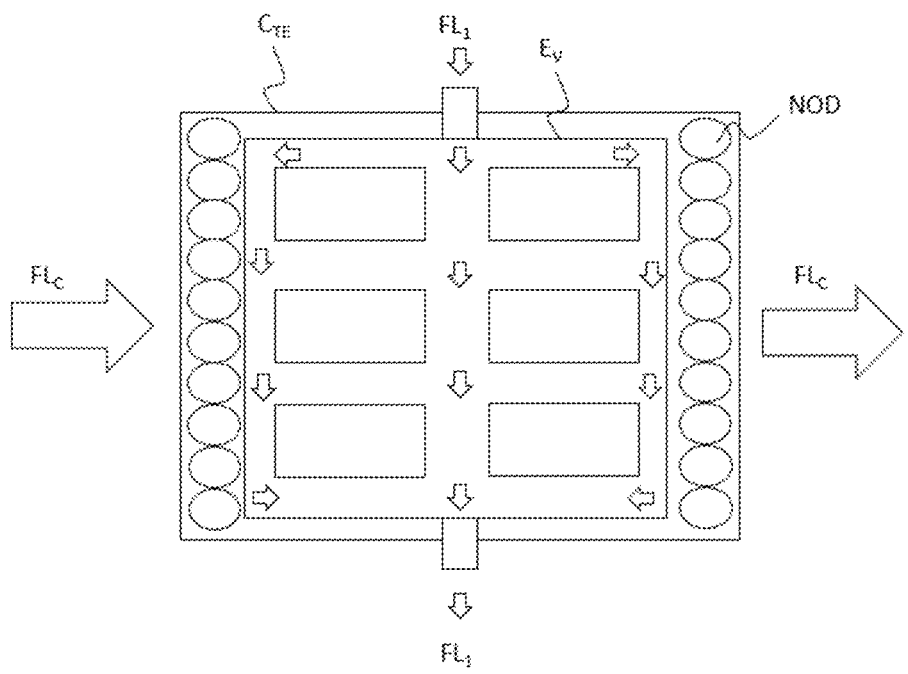
FIG. 2: a heat exchanger and a condenser in contact with a plurality of energy storage elements.

According to one embodiment, with reference to FIG. 2, the second heat exchanger $H_{TE}$ comprises the condenser $C_D$ of the heat pump. It is understood that the second heat exchanger $H_{TE}$ "comprises" the condenser $C_d$ by the fact that the condenser $C_d$ of the heat pump PAC is located in the internal zone of the second heat exchanger $H_{TE}$. This embodiment is particularly advantageous in that it enables energy transfers between the refrigerant fluid $FL_1$ circulating within the condenser $C_d$ and the energy storage elements NOD located in the second heat exchanger $H_{TE}$.

According to an exemplary case, the refrigerant fluid $FL_1$ circulates in the condenser $C_d$ located in the heat exchanger $H_{TE}$ and undergoes a change of state from a first gaseous state to a second liquid state by a condensation phenomenon. The state change of the refrigerant fluid $FL_1$ stems from a heat exchange between the energy storage elements NOD located in the second heat exchanger $H_{TE}$ and the refrigerant fluid $FL_1$. Indeed, the refrigerant fluid $FL_1$ gives up a part of its thermal energy $E_H$ to the energy storage elements NOD, which "hot recharge" during this heat exchange. The secondary fluid $FL_H$ circulating in the second heat exchanger $H_{TE}$ will next heat up on contact with the energy storage elements NOD which transmit a part $E_H$ of their thermal energy to said secondary fluid $FL_H$. The secondary fluid $FL_H$, which is heated by contact with the energy storage elements NOD, comprises for example air or water. In the context of this example, the secondary fluid $FL_H$ thus heated may then advantageously be used in heating applications within a building, for example the heating of the building itself or the heating of domestic hot water.

According to one case, the amount of thermal energy $E_C$ is substantially equal to the amount of thermal energy $E_H$. One advantage is that most of the energy taken by the refrigerant fluid $FL_1$ from the cold source is returned to the hot source. According to another case, the values of the amounts of thermal energy $E_C$ and $E_H$ are different, for example due to heat losses by the refrigerant fluid $FL_1$ between the cold source and the hot source.

According to one embodiment, the heat exchangers $C_{TE}$, $H_{TE}$ comprise an exchange interface with the external medium. According to one case, the interface comprises for example a heat exchanger and a rotating device such as a fan. One advantage is to be able to recover an amount of heat from the external medium, for example an amount of heat in the air of the external medium, to recharge the energy storage elements NOD of the heat exchangers $H_{TE}$ or $C_{TE}$.

According to one embodiment, the second heat exchanger $H_{TE}$ comprises means for recovering an amount of waste heat. The waste heat comes for example from an industrial site. One advantage is to be able to increase the thermal energy contained in the energy storage elements NOD of the second heat exchanger $H_{TE}$ by valorizing an amount of heat from another installation.

In one embodiment, at least one of the heat exchangers ($C_{TE}$, $H_{TE}$) comprises a phase-change material. According to one case, the phase-change material being in contact with an exchanger in which the refrigerant fluid ($FL_1$) circulates or an exchanger in which one of the secondary fluids ($FL_C$, $FL_H$) circulates. This is referred to as an exchanger within which one of the fluids ($FL_1$, $FL_C$, $FL_H$) circulates and allowing the implementation of heat exchange with said fluids.

Steam Energy Production Device

Figure 7:
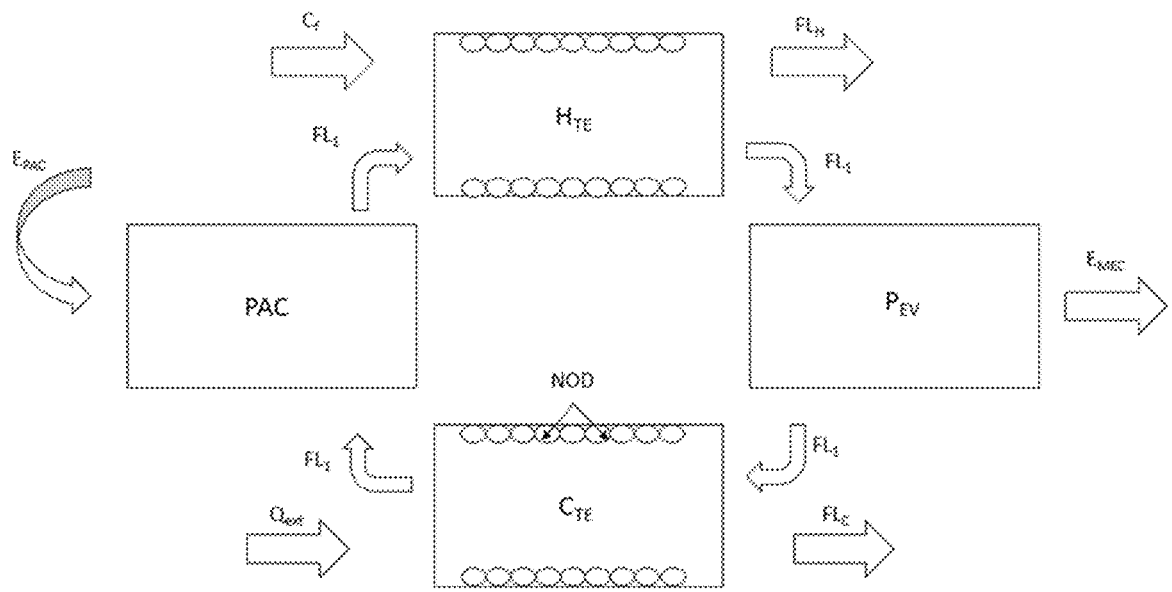
FIG. 7: a system comprising two heat exchangers, a heat pump and a turbine.

According to one embodiment, with reference to FIG. 7, the system of the invention comprises a steam energy production device $P_{EV}$. "Steam" energy production device is taken to mean that the production of energy by the device is achieved by conversion of the thermal energy contained in a given amount of steam circulating in said device into another amount of energy, for example mechanical or electrical.

Figure 8:
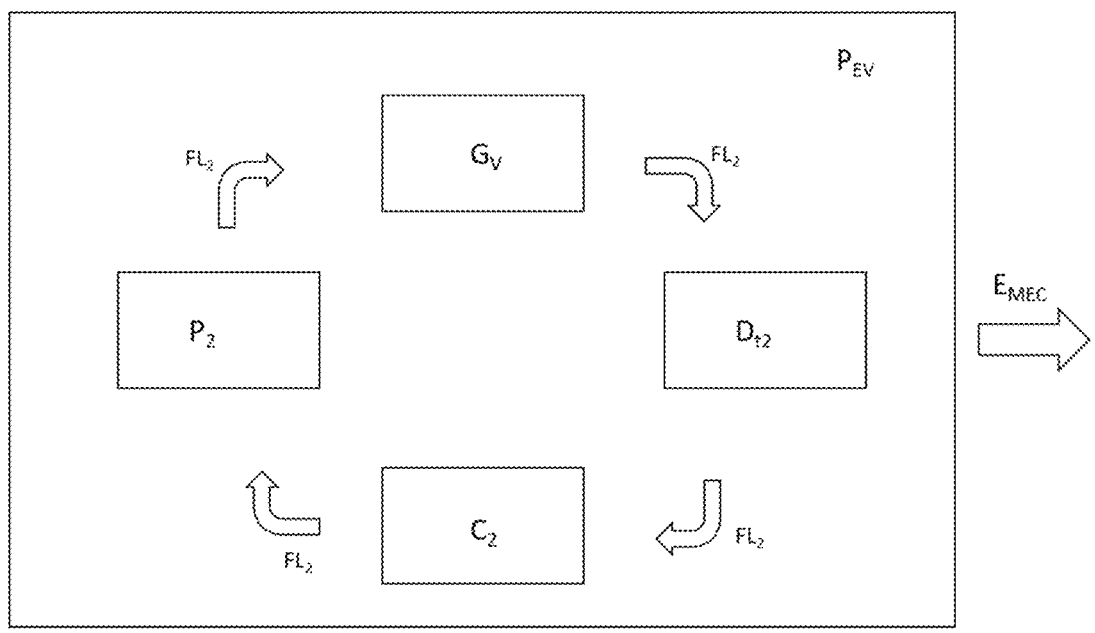
FIG. 8: a system comprising a steam energy production device.
Figure 9:
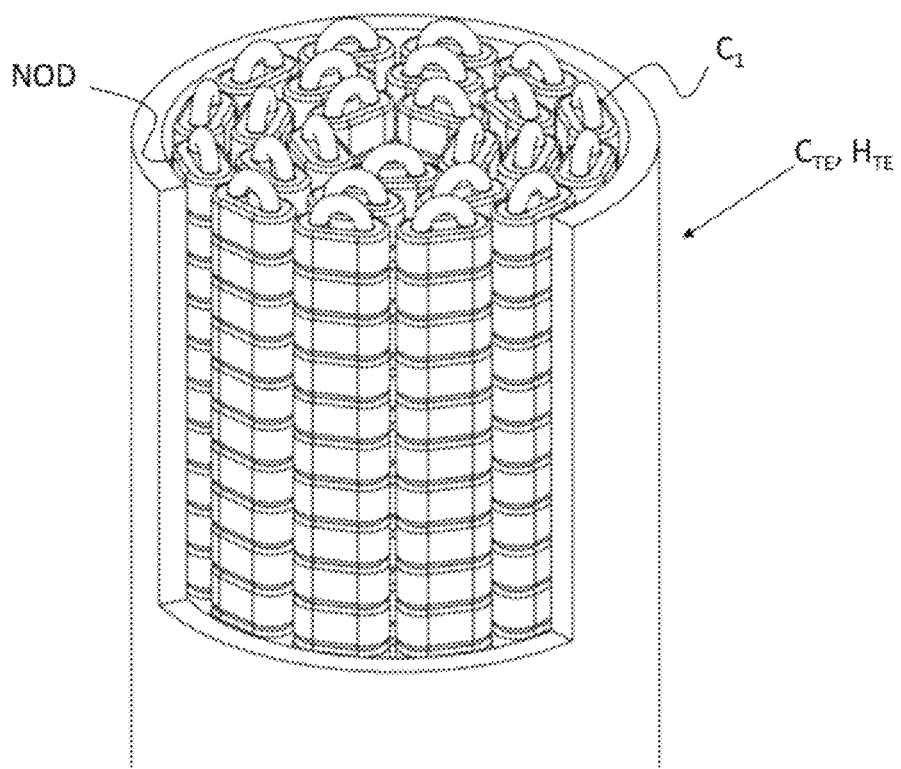
FIG. 9: a view of a heat exchanger having a substantially cylindrical shape, and comprising energy storage elements stacked and in contact with the first circuit in which the refrigerant fluid circulates.
Figure 10:
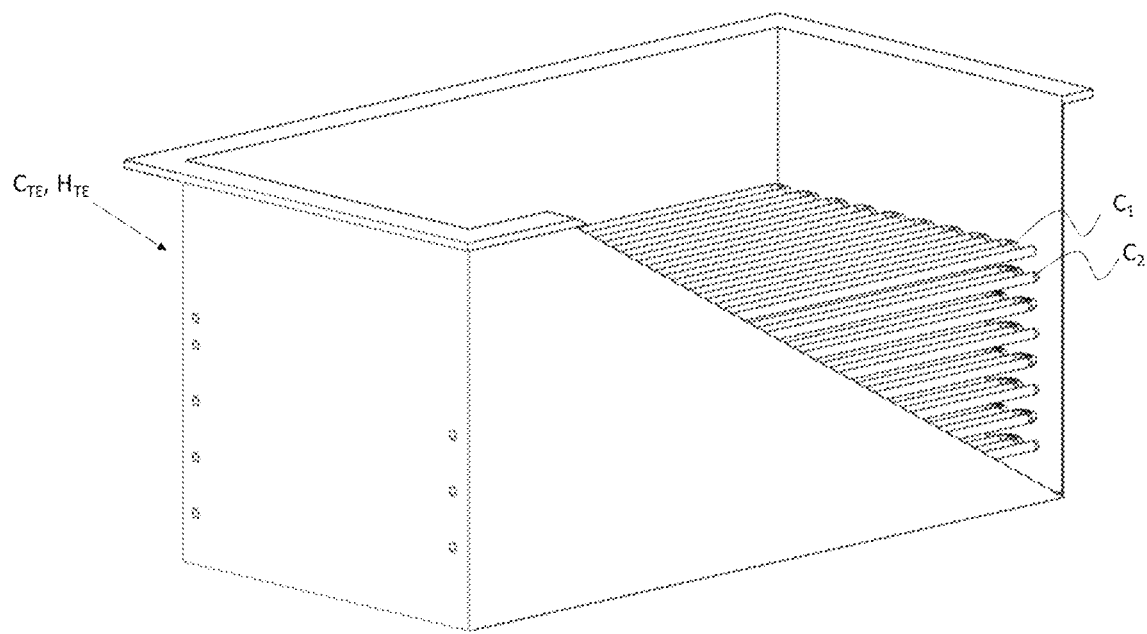
FIG. 10: a view of a heat exchanger having an overall cuboid shape, and comprising a portion of the first circuit and a portion of the second circuit.

According to one embodiment, with reference to FIG. 8, the steam energy production device $P_{EV}$ comprises a steam generator $G_V$, a second pump $P_2$, an expansion machine $D_{t2}$ and a second condenser $C_2$. A "second" condenser $C_2$ is referred to in order to distinguish it from the condenser $C_d$ described above for the implementation of one or several more conventional cycles of the heat pump PAC. In the remainder of the description, the expansion machine "$D_{t2}$" may be referred to by the term "turbine $D_{t2}$" to refer to the same expansion machine.

We will now describe in more detail the operation of the steam energy production device $P_{EV}$ as well as the different elements that may be part of said device when it is part of the system of the invention.

Figure 6:
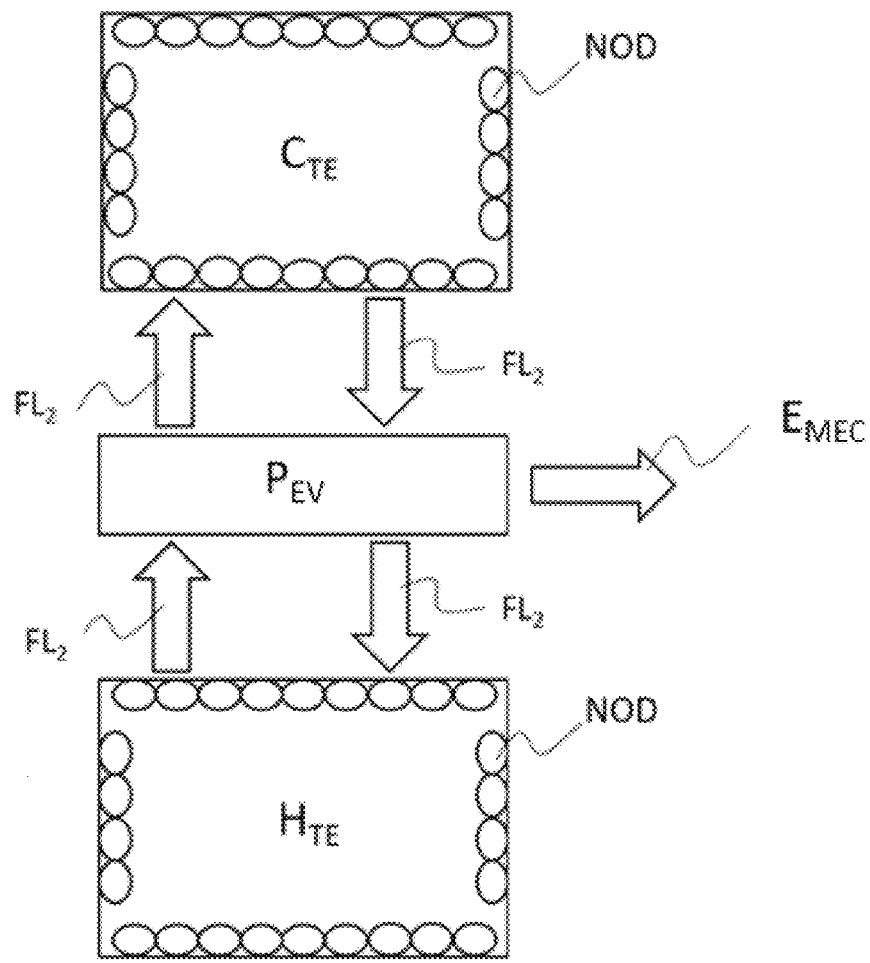
FIG. 6: a system comprising a steam energy production device.

With reference to FIG. 6, the steam energy production device $P_{EV}$ makes it possible to implement a steam energy production cycle. Such a cycle makes it possible, notably thanks to the thermal energy differential between a hot source and a cold source, to produce the amount of mechanical energy $E_{MEC}$. In this cycle, a condensable fluid is used that is cooled by the cold source to a pressure and temperature sufficient for it to be fully liquefied before compression. Under these conditions, the compression work becomes almost negligible compared to the expansion work. The compressed liquid is vaporized and potentially superheated by heat exchange with the hot source, then expanded and condensed. The diphasic state of the fluid during the condensation and vaporization phases is very favorable for heat exchanges. In one example, the mechanical energy $E_{MEC}$ produced next makes it possible to drive an alternator or generator to produce an amount of electrical energy.

According to different embodiments, the steam production device $P_{EV}$ is configured to implement different types of steam energy production cycles. According to different examples, the cycles implemented by the steam energy production device $P_{EV}$ comprise:

An organic Rankine cycle notably adapted for the production of mechanical energy from a hot source at medium or low temperature;
A Him cycle;
A cycle with regeneration and reheating;
A supercritical cycle such as a $CO_2$ supercritical cycle;
A Kalina cycle with a significant temperature glide;
An association of several cycles together to create combined cycles.

However, the type of steam energy production cycle used in the system of the invention is not limited to the aforesaid examples. Indeed, any steam energy production cycle technology or even any combination of steam energy production cycle technologies together are capable of being implemented in the system depending on the cases of use.

Steam Energy Production Device: 2$^{nd}$ Refrigerant

According to one embodiment, the steam energy production device $P_{EV}$ comprises a second refrigerant fluid $FL_2$. A "second" refrigerant $FL_2$ is referred to here to distinguish it from the first refrigerant $FL_1$ previously described in the implementation of thermodynamic cycles by the heat pump PAC. "The steam energy production device comprises a second refrigerant fluid $FL_2$" is taken to mean that the second refrigerant fluid $FL_2$ circulates within a closed circuit in said steam energy production device $P_{EV}$. In the remainder of the description, the second refrigerant fluid $FL_2$ will be referred to interchangeably by the terms "second refrigerant fluid $FL_2$" or "second heat transfer fluid $FL_2$" to designate the same fluid.

The second refrigerant fluid $FL_2$ makes it possible to convey an amount of thermal energy from a hot source to a cold source. According to various embodiments, the refrigerant fluid $FL_2$ comprises a mixture of fluids in liquid phase, a mixture of fluids in gaseous phase, or even a mixture of fluids comprising liquid and gaseous phases.

According to one embodiment, the refrigerant fluid $FL_1$ and the second refrigerant fluid $FL_2$ implemented in the system are of the same nature. In an alternative, the refrigerant fluids $FL_1$ and $FL_2$ are of different nature.

It is understood that the refrigerants $FL_1$ and $FL_2$ are "of different nature" both when said fluids $FL_1$ and $FL_2$ are in different physical states (for example one of the fluids comprising a mixture of fluids in gaseous phase and one of the fluids comprising a mixture of fluids in liquid phase); that when these fluids comprise different chemical compounds (for example, when one of the fluids comprises a hydrofluoroalkene and the other fluid comprises a hydrofluorocarbon.) One advantage is to be able to adapt the type of refrigerant fluid implemented in the different closed circuits according to the cases of application, notably to optimize the performances of the system.

According to different examples, the second refrigerant fluid $FL_2$ comprises hydrofluorocarbons also referred to by the acronym HFC such as the zeotropic mixture R407C, hydrocarbons also referred to by the acronym HC, ammonia also referred to as refrigerant by the designation R717 or even an azeotropic mixture also referred to as azeotropic mixture.

In a preferred embodiment, the second refrigerant $FL_2$ comprises a fluorinated derivative of the alkenes, for example a hydrofluoroalkene.

According to one example, the hydrofluoroalkene comprises 2,3,3,3-tetrafluoropropene, also referred to as "R-1234yf". One advantage is to implement a refrigerant with a reduced global warming potential and zero ozone depletion potential, and therefore more environmentally friendly.

However, the type of second refrigerant $FL_2$ used is not limited to the above examples and may also comprise any type of fluid or chemical compound capable of being used as a refrigerant fluid in the implementation of a second steam energy production cycle.

In one embodiment, with reference to FIG. 8, the second refrigerant $FL_2$ circulates in a closed circuit in contact with at least one of the heat exchangers $C_{TE}$, $H_{TE}$. A heat exchange is then possible between the second refrigerant $FL_2$ and one of the heat exchangers $C_{TE}$, $H_{TE}$.

In one example, the second refrigerant $FL_2$ circulates in a closed circuit and a heat transfer takes place between said second refrigerant $FL_2$ and a phase-change material contained in one of the exchangers $C_{TE}$, $H_{TE}$. From this heat exchange, there is an increase or decrease in the amount of thermal energy contained in the second refrigerant fluid $FL_2$. This is particularly advantageous for the implementation of a second energy production cycle, notably for the recovery of the thermal energy contained in one of said heat exchangers $C_{TE}$, $H_{TE}$.

Steam Energy Production Device: Pump $P_2$

According to one embodiment, the steam energy production device $P_{EV}$ comprises a pump $P_2$, referred to in the remainder of the description: second pump $P_2$. The second pump $P_2$ is advantageously used in the system for the implementation of a thermodynamic cycle by the steam energy production device.

In various embodiments, the second pump $P_2$ comprises a volumetric pump such as a screw pump, a piston pump, or a centrifugal or "turbopump". However, the aforesaid examples are for indicative purposes only, and any type of pump suited to operating within the steam energy production device is capable of being implemented in the system of the invention. The type of second pump $P_2$ implemented notably depends on the power of the steam energy production cycle implemented by the device. Advantageously, the second pump $P_2$ is arranged in the system so that exchanges with the environment are minimal.

According to one embodiment, the second pump $P_2$ is variable flow rate. Advantageously, the flow rate of the second pump $P_2$ may be adapted, for example to take into account the actual pressure losses of the system continuously and thus obtain better performances.

The second pump $P_2$ requires an electrical supply to operate. According to different embodiments, the electrical supply of the second pump $P_2$ may be provided by a connection to the electrical grid, by one or more batteries or even by an electrical supply system operating with one or more renewable energy sources.

According to different examples, the type of batteries used to supply the compressor comprises lithium-ion, Ni-Cad, Ni-Mh or Pb/Sla technologies. However, this embodiment of the invention is not limited to the aforesaid battery technologies, and any battery technology could be implemented to supply the second pump $P_2$.

According to several examples, the renewable energy source may comprise a solar energy source, a hydraulic energy source, a wind energy source, a geothermal source or even a biomass energy source. However, in the context of the invention, the aforesaid examples are not limiting and any renewable energy source could be exploited. It is also possible to supply the second pump $P_2$ with electrical energy from a combination of several renewable energy sources or even by a combination with another electrical energy supply system.

Steam Energy Production Device: Condenser

According to one embodiment, the steam energy production device $P_{EV}$ comprises a second condenser $C_2$. The role of the second condenser $C_2$ is to make the second refrigerant $FL_2$ undergo a change of state, which will then give up a part of its thermal energy in the form of latent heat and sensible heat to its environment.

According to one exemplary case, the second refrigerant fluid $Fl_2$ arrives at the outlet of the expansion machine $D_{t2}$ and enters the second condenser $C_2$ in gaseous form. The second refrigerant fluid $Fl_2$ in gaseous form then undergoes a phenomenon known as "desuperheating" by cooling at constant temperature and pressure. The second refrigerant fluid $Fl_2$ in gaseous form next undergoes a gradual change in state from a gaseous state to a liquid state during which it gives up a part of its thermal energy in the form of latent heat to the environment in which it operates. When the change of state to the liquid state has been completely achieved, the second refrigerant fluid $Fl_2$ undergoes a phenomenon known as "subcooling" at constant pressure by giving up a part of its thermal energy in the form of sensible heat to the environment in which it operates.

According to one example, the amount of thermal energy given up to the environment by the second refrigerant fluid $Fl_2$ comprises the latent heat of condensation, the sensible heat of subcooling and the sensible heat of superheated vapor of said second refrigerant fluid $Fl_2$.

In one embodiment, the heat given up by the second refrigerant fluid $Fl_2$ upon its change of state within the second condenser $C_2$ is stored within one of the heat exchangers $H_{TE}$, $C_{TE}$. One advantage is to valorize within the system the heat given up by the second refrigerant fluid $Fl_2$.

Steam Energy Production Device: Steam Generator

In one embodiment, the steam energy production device $P_{EV}$ comprises a steam generator $G_V$. The role of the steam generator $G_V$ is to make the second refrigerant fluid $Fl_2$ change state from a liquid state to a gaseous state.

According to an exemplary case, the second refrigerant fluid $Fl_2$ enters within the steam generator $G_V$ in liquid form and undergoes a change of state to the gaseous state within said steam generator $G_V$. This change in state induces a cooling of the second refrigerant fluid $Fl_2$, which is then going to capture heat from the medium in which it operates.

According to different embodiments, the type of steam generator $G_V$ implemented comprises a so-called "dry expansion" evaporator also called "overheating evaporator" or "dry evaporator", or a so-called "flooded" evaporator.

According to several examples, the dry expansion evaporator comprises a superheated multitubular evaporator, a brazed plate exchanger or a coaxial evaporator.

According to other examples, the "flooded" type evaporator comprises a flooded multitubular exchanger or a flooded coil exchanger. The evaporator implemented may also comprise a combination of several evaporator technologies.

According to other cases, the steam generator $G_V$ implemented comprises a finned evaporator with natural convection, a finned evaporator with forced convection or a smooth tube evaporator with natural convection.

Steam Energy Production Device: Expansion Machine

In one embodiment, the steam energy production device $P_{EV}$ comprises an expansion machine $D_{r2}$, also called turbine $D_{T2}$. The turbine $D_{r2}$ is implemented in the system to produce the amount of mechanical energy $E_{MEC}$ from the energy brought by the second refrigerant fluid $Fl_2$. This production of mechanical energy $E_{MEC}$ is notably made possible on account of the pressure difference between the steam generator $G_V$ and the second condenser $C_2$.

According to different embodiments, the expansion machine $D_{r2}$ comprises a back-pressure turbine, a condensation turbine, an extraction and back-pressure turbine or even an extraction and condensation turbine. According to other cases, the type of turbine $D_{r2}$ implemented comprises an impulse turbine or a reaction turbine. However, the type of turbine implemented is not limited to the aforesaid examples, which are for information only, and any type of expansion machine $D_{r2}$ is capable of being used in the system according to the cases of application.

According to one embodiment, the system comprises an alternator or a generator. The alternator or generator is for example coupled to the expansion machine $D_{r2}$. Such a coupling between a turbine and an alternator is also known in the literature as a "turbo-alternator". One advantage is to produce an amount of electrical energy from the mechanical power coming from the expansion machine $D_{r2}$.

In one embodiment, the steam energy production device may be managed by control means.

In one embodiment, the system comprises an electrical energy storage device. The role of such an electrical energy storage device is to store the electrical energy coming from the driving of the alternator by the turbine $D_{r2}$. According to different cases, the electrical energy storage device may comprise one or more batteries. The batteries may be of the same or different technologies.

According to various examples, the electrical energy storage device comprises a mounting of several batteries in series or instead a mounting of several batteries in parallel or even a mounting coupling batteries mounted in series and batteries mounted in parallel. According to different examples, the battery technologies involved comprise lithium-ion, Ni-Cad, Ni-Mh or Pb/Sla technologies. However, this embodiment of the invention is not limited to the aforesaid battery technologies, and any battery technology could be implemented to store the electrical energy from the driving of the alternator by the turbine $D_{r2}$.

In one embodiment, at least a part of the electrical energy produced by the coupling of said expansion machine $D_{r2}$ with an alternator is used to supply the heat pump PAC.

Sensors, Calculator and Memory

According to one embodiment, the system comprises sensors: According to different cases, the sensors may be pressure sensors, temperature sensors, or instead flow sensors or flow meters. More generally, the system is capable of comprising any type of sensor making it possible to measure, at different points, physical quantities associated with the different fluids $FL_C$, $FL_H$, $FL_1$ that circulate in the system. The sensors used may also comprise any type of sensor making it possible to measure physical quantities specific to the environment in which the said fluids operate or to the external medium.

According to one embodiment, the system comprises a memory. According to one example, the memory notably makes it possible to record the physical parameters measured by the different sensors in the system.

According to one case, the memory is accessible by a user, for example by means of a user interface, either to retrieve information recorded in said memory, or to store information therein, such as for example threshold values.

According to one embodiment, the system comprises a calculator: According to one case, the calculator is configured to communicate with the memory of the system to retrieve values stored in the memory of the system. Different calculations may next be implemented by the calculator. The calculations comprise for example comparisons between different system status values, such as the temperatures or pressures of the fluids $FL_1$, $FL_H$, $FL_C$ at different points in the system, or even comparisons of these values with threshold values parameterized beforehand by a user.

In one embodiment, the system comprises a communication interface. In one example, the communication interface allows the memory of the system to communicate with other connected equipment, for example equipment of a data network.

One advantage is to be able to exchange data between the equipment of a data network and the memory of the system, for example in the context of a bi-directional connection. Another advantage is to be able to clear the memory of the system. Another advantage is to be able to retrieve data stored on a server, for example new threshold values.

Control Means

According to one embodiment, the system comprises control means 3. The interest of the control means 3 is to be able to manage different items of equipment of the system. The items of equipment of the system comprise for example opening valves to increase or decrease the flow rate of one of the fluids $FL_1$, $FL_C$, $FL_H$ circulating in the system.

In one embodiment, the control means 3 are configured to manage an item of equipment of the system from the implementation of a calculation by the calculator. The calculation comprises for example a comparison between different system status values or even a comparison of system status values with one or more threshold values. The items of equipment of the system managed by the control means 3 are for example opening valves or actuators.

According to one case, the control means comprise a command member to switch the supply source of the heat pump PAC. According to one example, the temperatures of at least two fluids among the fluids $FL_C$, $FL_H$, $FL_1$ circulating in the system are measured at different points. The measured values are next compared with each other or with threshold values by the calculator. The command member than makes it possible to switch the supply source of the heat pump PAC, for example from the mains to the secondary circuit or vice versa, as a function of these results. According to other examples, the compared values are not the temperature values of the fluids, but values of other physical parameters of the system such as pressure values or flow rate values.

The compared values may also comprise a current electricity cost value with a threshold value, for example recorded in the memory of the system. One advantage is to consume the electrical energy from the secondary circuit 3 when the cost of electricity becomes too high compared to a predetermined threshold value.

Second Heat Pump

The system comprises a second heat pump $PAC_2$. The second heat pump comprises a third circuit $C_3$ in which a third refrigerant fluid $FL_3$ circulates. The third refrigerant fluid $FL_3$ circulates through an evaporator of the second heat pump $PAC_3$ and a condenser of the second heat pump $PAC_2$.

The evaporator of the second heat pump $PAC_2$ makes it possible to evaporate the third refrigerant fluid $FL_3$ by a calorific exchange between a primary calorie source $S_1$ and said refrigerant fluid $FL_3$. The primary calorie source $S_1$ comprises for example air, a solar energy source, a geothermal source or even a water source. In the case of air and water, the heat exchange between the third refrigerant fluid $FL_3$ and the primary calorie source $S_1$ takes place for example by direct exchange. In the case of a solar source or geothermal source, the exchange of calories takes place for example via another heat transfer fluid, for example water.

The condenser of the second heat pump $PAC_2$ makes it possible to condense the third refrigerant fluid $FL_3$. The condenser of the second heat pump $PAC_2$ is placed in the first heat exchanger $C_{TE}$. This configuration advantageously enables a calorific exchange on the one hand between the third refrigerant fluid and the secondary fluid $FL_C$, $FL_H$, and on the other hand between the third refrigerant fluid $FL_3$ and the phase-change material MCP.

The invention claimed is:

1. A system comprising
   a first heat pump comprising an evaporator and a condenser, and comprising means for conveying a refrigerant fluid between two heat exchangers, said refrigerant fluid circulating through a first closed circuit;
   a first heat exchanger and a second heat exchanger, the first heat exchanger being used as cold source by the heat pump, and at least one of said first and second heat second exchangers comprising:
   i. a portion of the first circuit to convey the refrigerant fluid through said first or second heat exchanger;
   ii. a portion of a second circuit in which a secondary fluid circulates, to convey said secondary fluid through said first or second heat exchanger;
   iii. a phase-change material distributed in the heat exchanger and collecting a portion of an amount of thermal energy transported by the refrigerant fluid in the portion of the first circuit or by the secondary fluid in the portion of the second circuit;
   a second heat pump comprising an evaporator and a condenser and comprising a third circuit for conveying a third refrigerant fluid between the evaporator and the condenser of said second heat pump, said evaporator allowing a calorific exchange between the third refrigerant fluid and a primary calorie source and said condenser being positioned in the first heat exchanger to allow a calorie exchange between, on the one hand, the third refrigerant fluid and the phase-change material, and, on the other hand, the third refrigerant fluid and the secondary refrigerant fluid.

2. The system according to claim 1, wherein the portion of the first circuit and the portion of the second circuit form curves of substantially equal dimensions each extending between two walls of the heat exchanger and forming successive plates defining a volume inside the heat exchanger, the phase-change material being arranged around the volume and between the plates formed by the first circuit and the second circuit, to promote heat exchanges between, on the one hand, the phase-change material and the refrigerant fluid, and, on the other hand, the phase-change material and the secondary fluid.

3. The system according to claim 1, comprising a plurality of energy storage elements comprising the phase-change material, said energy storage elements being distributed in said heat exchangers and in contact with the portion of the first circuit and the portion of the second circuit to enable, on the one hand, a calorific exchange between the refrigerant fluid and the phase-change material and, on the other hand, a calorific exchange between the phase-change material and the secondary fluid.

4. The system according to claim 3, wherein the energy storage elements have a substantially oblong shape, and comprise a central opening allowing an apex of a curve of the portion of the first circuit to be inserted through said energy storage elements, so as to promote a calorific exchange between the refrigerant fluid and the phase-change material.

5. The system according to claim 4, wherein the first heat exchanger or the second heat exchanger has a substantially cylindrical shape, and wherein the energy storage elements are substantially equal in size to allow a stacking of said energy storage elements over several loops of the portion of the first circuit.

6. The system according to claim 3, wherein the energy storage elements comprise surface singularities to promote turbulent flow of the secondary fluid.

7. The system according to claim 1, wherein the evaporator is positioned in the first heat exchanger and the condenser is positioned in the second heat exchanger, and wherein the first heat exchanger and the second heat exchanger each comprise the energy storage elements that are in contact with said evaporator and said condenser of the first heat pump.

8. The system according to claim 1, wherein the portion of the first circuit of the first heat exchanger and/or the second heat exchanger forms curves of substantially equal dimensions.

9. The system according to claim 1, comprising means for recovering an amount of waste heat and means for conveying said amount of waste heat to at least one circuit of the second heat exchanger.

10. The system according to claim 1, comprising a steam energy production device comprising at least one expansion machine, said expansion machine being supplied by at least a part of the thermal energy stored by the phase-change material, said steam energy production device being capable of producing mechanical energy from said expansion machine.

11. The system according to claim 10, comprising a generator or an alternator for producing an amount of electrical energy from the mechanical energy produced from the expansion machine.

12. The system according to claim 1, comprising a memory for periodically recording temperatures of at least two fluids among the following fluids:
   a part of the refrigerant fluid circulating in the first heat exchanger;
   a part of the refrigerant fluid circulating in the second heat exchanger;
   the refrigerant fluid entering the first heat exchanger;
   the secondary fluid exiting the first heat exchanger;
   the refrigerant fluid entering the second heat exchanger;
   the secondary fluid exiting the second heat exchanger, and
      comprising a calculator to perform a calculation of a difference between temperatures recorded in the memory or to implement at least one calculation of a comparison of at least one temperature recorded with at least one threshold value, said system comprising a command member receiving a setpoint determined as a function of calculations implemented by the calculator, to:

manage the flow of the refrigerant fluid or the secondary fluid or, manage a shut-off valve of the steam energy production device.

* * * * *